(12) United States Patent
West

(10) Patent No.: US 9,273,744 B2
(45) Date of Patent: Mar. 1, 2016

(54) HYDRAULICALLY DAMPED MOUNTING DEVICE

(71) Applicant: DTR VMS LIMITED, Wiltshire (GB)

(72) Inventor: John West, Nottingamshire (GB)

(73) Assignee: DTR VMS Limited, Wiltshire (GB)

( * ) Notice: Subject to any disclaimer, the term of this patent is extended or adjusted under 35 U.S.C. 154(b) by 61 days.

(21) Appl. No.: 13/940,472

(22) Filed: Jul. 12, 2013

(65) Prior Publication Data
US 2014/0014450 A1 Jan. 16, 2014

(30) Foreign Application Priority Data

Jul. 13, 2012 (GB) .................................. 1212534.0

(51) Int. Cl.
| | |
|---|---|
| *F16F 9/10* | (2006.01) |
| *F16F 13/26* | (2006.01) |
| *F16F 13/10* | (2006.01) |

(52) U.S. Cl.
CPC ................ *F16F 9/10* (2013.01); *F16F 13/262* (2013.01); *F16F 13/10* (2013.01); *F16F 13/105* (2013.01); *F16F 13/107* (2013.01)

(58) Field of Classification Search
CPC .......... F16F 13/08; F16F 13/10; F16F 13/26; F16F 13/105; F16F 13/106; F16F 13/107; F16F 13/262
USPC ........................................ 267/140.14, 140.15
See application file for complete search history.

(56) References Cited

U.S. PATENT DOCUMENTS

| | | | | |
|---|---|---|---|---|
| 5,167,403 A | * | 12/1992 | Muramatsu et al. ..... | 267/140.13 |
| 5,180,148 A | * | 1/1993 | Muramatsu .............. | 267/140.14 |
| 5,217,211 A | * | 6/1993 | Ide et al. .................. | 267/140.13 |
| 5,246,212 A | * | 9/1993 | Funahashi et al. ........ | 267/140.13 |
| 5,314,173 A | * | 5/1994 | Ide et al. ................... | 267/140.14 |
| 5,344,127 A | | 9/1994 | Hettler et al. | |
| 5,462,261 A | | 10/1995 | Eckel et al. | |
| 5,462,262 A | | 10/1995 | Gennesseaux | |
| 5,492,311 A | | 2/1996 | Kurr et al. | |
| 5,549,284 A | | 8/1996 | Lee | |
| 5,632,472 A | | 5/1997 | Kato et al. | |
| 5,782,462 A | | 7/1998 | Hein et al. | |
| 5,833,219 A | | 11/1998 | Mellon | |
| 5,911,412 A | | 6/1999 | Durand et al. | |
| 6,017,024 A | | 1/2000 | Muramatsu et al. | |
| 6,056,279 A | | 5/2000 | Lee et al. | |

(Continued)

FOREIGN PATENT DOCUMENTS

| | | |
|---|---|---|
| CA | 2716344 A1 | 8/2009 |
| DE | 4326425 C1 | 10/1994 |

(Continued)

OTHER PUBLICATIONS

English Translation, Vibroisolating Apparatus, Takao Ushijima et al., translated Jul. 2015.*

*Primary Examiner* — Thomas J Williams

(74) *Attorney, Agent, or Firm* — McGarry Bair PC

(57) ABSTRACT

A hydraulically damped mounting device (10) having a flow limiting element (42), such as a resilient diaphragm, in a switchable auxiliary passageway (36) that is in fluid communication with its working chamber (22). The switchable auxiliary passageway corresponds to an additional fluid mass that can be switched into and out of communication with the working chamber to control the vibration characteristics of the device.

17 Claims, 11 Drawing Sheets

(56) References Cited

U.S. PATENT DOCUMENTS

| | | |
|---|---|---|
| 6,244,578 B1 | 6/2001 | Schwerdt |
| 6,276,672 B1 | 8/2001 | Rudolf et al. |
| 6,352,248 B1 | 3/2002 | Hamaekers et al. |
| 6,357,730 B1 | 3/2002 | Gugsch et al. |
| 6,378,852 B1 | 4/2002 | Ticks et al. |
| 6,439,554 B1 | 8/2002 | Takashima et al. |
| 6,523,813 B1 | 2/2003 | Kato |
| 6,592,110 B2 | 7/2003 | Takashima et al. |
| 6,598,864 B2 | 7/2003 | Freudenberg et al. |
| 6,601,835 B2 | 8/2003 | Genesseaux |
| 6,663,090 B2 | 12/2003 | Simuttis et al. |
| 6,663,091 B2 | 12/2003 | West |
| 6,921,067 B2 * | 7/2005 | Gries et al. ............... 267/140.14 |
| 7,258,331 B2 | 8/2007 | Schneider |
| 7,306,210 B2 | 12/2007 | Happou et al. |
| 7,318,582 B2 | 1/2008 | Freudenberg et al. |
| 7,347,437 B1 | 3/2008 | Oblizajek et al. |
| 7,416,173 B2 | 8/2008 | Tanaka |
| 2001/0026038 A1 | 10/2001 | Muramatsu et al. |
| 2001/0030390 A1 | 10/2001 | Vermaerke et al. |
| 2002/0000688 A1 | 1/2002 | Simuttis et al. |
| 2002/0005607 A1* | 1/2002 | Muramatsu et al. ..... 267/140.11 |
| 2002/0043748 A1 | 4/2002 | Meyer |
| 2002/0109279 A1 | 8/2002 | Muramatsu et al. |
| 2003/0011117 A1 | 1/2003 | Nishi et al. |
| 2003/0205856 A1 | 11/2003 | Hibi et al. |
| 2004/0245690 A1 | 12/2004 | Winkler et al. |
| 2005/0225016 A1 | 10/2005 | Bregeault |
| 2006/0006593 A1 | 1/2006 | Bretaudeau et al. |
| 2008/0174058 A1* | 7/2008 | Saiki et al. ............... 267/140.14 |
| 2008/0179798 A1* | 7/2008 | Saiki et al. ............... 267/140.14 |
| 2008/0296818 A1* | 12/2008 | Koyama et al. .......... 267/140.14 |
| 2009/0302515 A1 | 12/2009 | Graeve et al. |
| 2011/0291336 A1 | 12/2011 | Meyer et al. |
| 2012/0046485 A1 | 2/2012 | Wrobel et al. |
| 2012/0049424 A1 | 3/2012 | Bradshaw et al. |

FOREIGN PATENT DOCUMENTS

| | | |
|---|---|---|
| DE | 19801277 A1 * | 7/1999 |
| DE | 19807868 A1 | 9/1999 |
| DE | 19929866 A1 | 1/2000 |
| DE | 10104458 A1 | 9/2002 |
| DE | 10302385 A1 | 8/2004 |
| DE | 10316283 A1 | 10/2004 |
| DE | 10332081 A1 | 3/2005 |
| DE | 10342318 A1 | 4/2005 |
| DE | 10200501666 A1 | 10/2006 |
| DE | 102006003882 A1 | 8/2007 |
| EP | 0115417 A2 | 8/1984 |
| EP | 0172700 A1 | 2/1986 |
| EP | 0775844 A2 | 5/1997 |
| EP | 0821181 A2 | 1/1998 |
| EP | 0852304 A1 | 7/1998 |
| EP | 0886080 A1 | 12/1998 |
| EP | 0939243 A2 | 9/1999 |
| EP | 0961049 A2 | 12/1999 |
| EP | 1544500 A2 | 6/2005 |
| EP | 2253863 A2 | 11/2010 |
| EP | 2327904 A2 | 6/2011 |
| EP | 2388495 A2 | 11/2011 |
| FR | 2774734 A1 | 8/1999 |
| GB | 2282430 A | 4/1995 |
| GB | 2294525 A | 5/1996 |
| GB | 2343230 A | 5/2000 |
| JP | 60113832 A * | 6/1985 |
| JP | 04272533 A * | 9/1992 |
| JP | 370290952 B2 | 10/2005 |
| RU | 2211386 C2 | 8/2003 |
| WO | 2004065818 A1 | 8/2004 |
| WO | 2006108836 A1 | 10/2006 |
| WO | 2007128797 A1 | 11/2007 |
| WO | 2011076455 A1 | 6/2011 |
| WO | 2012025276 A1 | 3/2012 |

* cited by examiner

HYDRAULICALLY DAMPED MOUNTING DEVICE

CROSS-REFERENCE TO RELATED APPLICATION(S)

This application claims the benefit of British Patent Application No. GB1212534.0, filed Jul. 13, 2012, which is incorporated herein by reference in its entirety.

BACKGROUND

1. Field of the Invention

The invention relates to a hydraulically damped mounting device. Such a device usually has a pair of chambers for hydraulic fluid, connected by a suitable passageway, and damping is achieved due to the flow of fluid through that passageway.

2. Background of the Invention

EP-A-0115417 and EP-A-0172700 discuss two different types of hydraulically damped mounting devices for damping vibration between two parts of a piece of machinery, e.g. a car engine and a chassis. EP-A-0115417 disclosed various "cup and boss" type of mounting devices, in which a "boss", forming one anchor part to which one of the pieces of machinery is connected, is itself connected via a deformable (normally resilient) wall to the mouth of a "cup", which is attached to the other piece of machinery and forms another anchor part. The cup and the resilient wall then define a working chamber for hydraulic fluid, which is connected to a compensation chamber by a passageway (usually elongate) which provides the damping function.

In EP-A-0172700 the mounting devices disclosed are of the "bush" type. In this type of mounting device, the anchor part for one part of the vibrating machinery is in the form of a hollow sleeve with the outer anchor part in the form of a rod or tube extending approximately centrally and coaxially of the sleeve. In EP-A-0172700 the tubular anchor part is connected to the sleeve by resilient walls, which define one of the chambers in the sleeve. The chamber is connected via a passageway to a second chamber bounded at least in part by a bellows wall which is effectively freely deformable so that it can compensate for fluid movement through the passageway without itself resisting that fluid movement.

In the hydraulically damped mounting devices disclosed in the specifications discussed above, there is a single passageway. It is also known, from other hydraulically damped mounting devices, to provide a plurality of independent passageways linking the chambers for hydraulic fluid.

In EP-A-0115417, the compensation chamber is separated from the working chamber by a rigid partition, which contains a flexible diaphragm which is in direct contact with the hydraulic fluid and, together with the partition, forms a gas pocket. The diaphragm is configured to give a specific influence on the vibration characteristics of the hydraulically damped mounting device. Those characteristics depend on the stiffness of the diaphragm, by which is meant the change in applied pressure needed to cause unit change in the volume displaced by the diaphragm. Furthermore, the surface of the diaphragm which is in contact with the fluid in the working chamber may be covered by a snubber plate, with openings therein for fluid communication therethrough between the upper surface of the diaphragm and the rest of the working chamber, and it has been found that the size of those openings also affects the characteristics of the mount.

In GB-A-2282430, a mounting device is disclosed of the "cup and boss" type, with two diaphragms. The two diaphragms are arranged to have different characteristics, such as different stiffnesses or different effective stiffnesses, due to the shape of the openings by which fluid reaches those diaphragm parts from the working chamber. GB-A-2282430 also discloses that either or both of the diaphragms may be convoluted.

It is also known to provide an additional passageway to link the working chamber with another hydraulic chamber, separate from the compensation chamber, the additional passageway having a lower fluid resistance than the passageway between the working and compensation chambers.

In U.S. Pat. No. 5,180,148, a passage is formed between a pressure receiving chamber and a second equilibrium chamber. The passage is normally closed, and is held closed by the action of an elastic dish member which bears against a diaphragm via a thin rigid disk. The passage can be opened by application of a vacuum on the side of the elastic dish member not bearing against the diaphragm, so that the elastic dish member is separated from the diaphragm.

In U.S. Pat. No. 6,017,024, a passage is formed between a primary fluid chamber and an auxiliary fluid chamber. The passage is normally held closed by the action of a tensile spring, which bears against a circular metal disk. The metal disk is movable relative to the passage by flexing of a surrounding annular rubber member. This movement is controlled by control of the pressure in a vacuum chamber underneath the metal disk.

The additional passageway is typically known as a bypass or secondary channel. Normally, the bypass channel is opened, e.g. by supplying a vacuum to actuate a switching member, when the engine is at idle. The lower fluid resistance that occurs when the bypass channel is open reduces the dynamic mass effect of the body of hydraulic fluid contained in the channels, and thereby increases the frequency of the eigenmode exhibited by the device. This is advantageous in that it enables a stiffness drop or dip to be positioned at the main engine forcing or problem frequency, typically the firing frequency. The reduction in stiffness results in better isolation at idle and reduction of vibration in the vehicle cabin.

When the vehicle is in ride mode it is important that the bypass channel remains closed in order to keep the main passageway tuned to a lower frequency commensurate with its primary function of damping overall engine-gearbox vibration. This means the vacuum switched valve has to be capable of resisting significant pressures, e.g. when the vehicle drives over rough surfaces and/or when the mounting is subject to large movements.

BRIEF SUMMARY

At its most general, the present invention proposes providing a flow limiting element, such as a resilient diaphragm, in a switchable auxiliary passageway that is in fluid communication with the working chamber of a hydraulically damped mounting device. The switchable auxiliary passageway may correspond to an additional fluid mass that can be switched into and out of communication with the working chamber to control the vibration characteristics of the device, e.g. in a similar way to the bypass channel discussed above.

The inventor has realised that only a relatively small volume of fluid needs to flow in the auxiliary passageway when open in order to achieve a dip in stiffness at a desired frequency. This effect arises from a combination of two factors. Firstly, the amplitude of vibrations from an idling engine input is small, e.g. less than ±0.2 mm. Secondly, because the dip in stiffness occurs at a frequency that is lower than the eigenfrequency of the auxiliary passageway itself, the fluid flow in the auxiliary passageway at the dip in stiffness is reduced. As a result of this understanding, the inventor realised that a flow limiting element could be provided in an auxiliary passageway without affecting its performance.

One advantage of a flow limiting element is that it can restrict the maximum pressure exerted on the actuator that switches the auxiliary passageway into and out of communication with the working chamber. In other words, providing a flow limiting element can reduce the forces experienced by a valve actuator that closes a bypass channel. Reducing the maximum pressure that the actuator is required to react against enables the actuator to be smaller and more responsive. The high pressures applied to the actuator occur due to relatively high amplitude inputs, which can be an order of magnitude higher than the idling engine input mentioned above, e.g. up to ±2 mm. The flow limiting element can be arranged to prohibit fluid flow corresponding to these larger fluid volumes, whilst permitting fluid flow at smaller volumes.

Thus, according to the invention there may be provided a hydraulically damped mounting device comprising: first and second anchor parts connected by a first deformable wall; a working chamber partially bounded by the first deformable wall, the working chamber containing hydraulic fluid; a compensation chamber for the hydraulic fluid, the compensation chamber being partially bounded by a second deformable wall; a first passageway interconnecting the working and compensation chambers to allow movement of the hydraulic fluid between the working and compensation chambers; a second passageway in fluid communication with the working chamber; an actuator mounted to control fluid flow in the second passageway, the actuator being switchable between a first position in which it restricts fluid flow through the second passageway and a second position in which it permits fluid flow through the second passageway; and a flow limiting element mounted to prohibit movement of fluid through the second passageway beyond a threshold volume when the actuator is in the second position, the flow limiting element being independent of the second deformable wall. Thus, the actuator controls fluid flow such that in the first position there is unrestricted flow in the first passageway and restricted flow (which may be zero flow) in the second passageway, whereas in the second position there is unrestricted flow in both passageways (although the free flow in the second passageway is only within the threshold volume permitted by the flow limiting element). The actuator may be adjustable to occupy any intermediate position between the first and second positions, e.g. to permit progressive control of the flow device. In this manner, the device may allow for tuning different conditions.

The first position may correspond to a ride mode of the device, and the second position may correspond to an idle mode of the device. Here "ride" and "idle" may reflect the state of the engine whose vibrations are being damped or isolated.

The first deformable wall may be made of a resilient material so as to expand and/or contract in response to relative movement between the first and second anchor parts. The second deformable wall allows the compensation chamber to expand to receive fluid that moves from the working chamber through the first passageway. In the device according to the invention, there are two factors influencing the contribution of the second passageway to the overall damping behaviour of the device, viz. the actuator and the flow limiting element. The flow limiting element may provide a physical limit (independently of the compensation chamber) on the maximum volume of fluid that can flow along the second passageway. The actuator can act either as a means for opening and closing the second passageway, i.e. to switch it into or out of communication with the working chamber, or as a means for adjusting the flow limiting element, i.e. adjusting its stiffness and/or range or movement. One possible advantage of the invention is that the actuator may be made smaller than in conventional switched bypass channels, which may in turn reduce the actuation power required and speed up the response time of the device. This advantage may be particularly useful in engines with a high number of cylinders, e.g. eight or twelve, where a large flow area is desirable in the bypass channel to provide a relatively high idle dip frequency. A large flow area can increase the force experienced by the actuator for a high amplitude input.

The first passageway and second passageway may be formed in or through a rigid partition separating the working chamber from the compensation chamber. The partition may be rigidly associated with the first anchor part. The second passageway may be in fluid communication with the compensation chamber, i.e. may comprise a bore extending through the partition to provide a bypass channel. Alternatively, the second passageway may represent an idle chamber, i.e. an auxiliary chamber separate from the compensation chamber. The idle chamber may terminate at a third deformable wall which partially encloses an air space that is vented to atmosphere to permit fluid movement within the second passageway.

The flow limiting element may be closer to the working chamber than the actuator along the second passageway, e.g. located upstream from the actuator. Other arrangements are also possible.

The flow limiting element may comprise a resilient diaphragm, i.e. an elastically flexible plate, which is mounted across a fluid flow path through the second passageway. The diaphragm may be sealed in position, whereby no fluid passes the diaphragm, so that the movement of fluid in the second passageway occurs solely due to flexing of the diaphragm. In this arrangement, the periphery of the diaphragm may be clamped in place. For example, the partition may comprise a first plate member coupled to a second plate member, wherein the periphery of the diaphragm is clamped between the first and second plate members. In this arrangement, the first passageway and/or second passageway may be formed as recesses in one or both of the first and second plate members.

Alternatively, the diaphragm may be mounted in a "floating" manner, e.g. by having its periphery mounted in a corresponding groove around an inner surface of the second passageway. In this arrangement, a small amount of fluid, e.g. resulting from small amplitude inputs, can physically pass the diaphragm, but any large amplitude fluid movement may push the periphery of the diaphragm against its groove and act to seal the passageway.

The device may include a snubbing element to restrict the range of movement of the flow limiting member. For example, the snubbing element may be a shaped surface formed in the partition. The snubbing element may thus assist in limiting the maximum volume of fluid that can flow in the second passageway.

The flow limiting element (e.g. resilient diaphragm) may operate passively. However, in some embodiments, the flow limiting element may be actively controlled, e.g. to exhibit different stiffness properties when the actuator is in the first position from when the actuator is in the second position.

For example, the resilient diaphragm may be mounted between the second passageway and a gas pocket, whereby it has fluid on one side and gas (e.g. air) on the other. The behaviour of the diaphragm may be controlled via the gas pocket, e.g. by switching an air vent connected to the gas pocket between open and closed positions or by switching a vacuum source connected to the gas pocket to vary the pressure therein. The gas pocket may be formed in the partition.

Alternatively or additionally, the actuator may be arranged to abut the flow limiting element, whereby the actuator directly influences the behaviour of the flow limiting element. For example, in some embodiments, the actuator may contact the resilient diaphragm in the first position to impart further stiffness thereto, whereas the actuator may be spaced from the diaphragm in the second position to permit the diaphragm to move more freely. Thus, the function of the actuator in this arrangement may be treated as a stiffness adjuster for limited volume flow, whereby the restriction and permission of fluid flow in the secondary channel due to the position of the actuator arises from its effect on the behaviour of the diaphragm. In one embodiment, the actuator may include a resilient portion that biases an abutment portion into contact with the flow limiting diaphragm. The actuator may be orientated so that the biasing force of the resilient portion reacts against negative pressure in the working chamber. Since peak negative pressure experienced in the working chamber is typically an order of magnitude less than peak positive pressure, this orientation enables the actuator to be smaller and more responsive.

In other embodiments, the actuator may operate more conventionally as a means for opening and closing the second passageway. Thus, the actuator may abut a seat portion in the first position to close the second passageway and may be spaced from the seat portion in the second position to open the second passageway. The seat portion may be part of the partition, e.g. a cooperating surface formed on the first or second plate member. The actuator may be movably mounted in a vacuum chamber that is connectable to a vacuum source for varying the pressure in the vacuum chamber. For example, the vacuum chamber may be partially bounded by the actuator. The actuator may therefore be movable in the vacuum chamber in response to a change in pressure in the vacuum chamber between the first position and second position. The vacuum chamber may be connected to the same vacuum source as the gas pocket referred to above, whereby an active resilient diaphragm can be switched simultaneously with the actuator.

Other switching mechanisms can be used with the actuator, e.g. an electrically switched spring or the like. The actuator may comprise a resilient biasing member arranged to bias the actuator towards the first position, e.g. on to the seat portion mentioned above.

In a development of the present invention, the flow limiting element may have an additional mass connected to it. For example, the resilient diaphragm may have a mass embedded in it or physically attached, e.g. bonded to it. The additional mass may function as part of the vibratable mass in the second passageway, and hence can be used to replace some of the hydraulic fluid in the second passageway, which may enable the length of the second passageway to be reduced, e.g. if the mass is more dense than the hydraulic fluid. This arrangement may therefore facilitate a compact arrangement.

The hydraulically damped mounting device of the invention may also comprise a decoupling diaphragm mounted between the working chamber and a gas pocket, as discussed above with reference to EP-A-0115417. The decoupling diaphragm may act as a deformable wall to aid isolation of vibrations, especially small amplitude vibrations. Conventionally, it is desirable to increase the stiffness of the decoupling diaphragm in the idle mode, in order to maximise the dip in stiffness of the device. An increase in stiffness can be achieved by evacuating the gas pocket using a suitable vacuum source.

However, providing a deep dip in stiffness at the idle frequency can result in the stiffness profile of the device exhibiting an increased stiffness at twice the idle frequency. To counteract this, the inventor has conceived of reducing the stiffness of the decoupling diaphragm in the idle mode compared with its stiffness in the ride mode. Softening the decoupling diaphragm will result in a smaller dip (i.e. relatively higher stiffness in the idle mode) but a lower stiffness at twice the idle frequency. To achieve this, the decoupling diaphragm may be preloaded, e.g. biased against the partition, to provide high stiffness in the ride mode. When the device is switched into its idle mode, the pre-loading force is removed, e.g. by applying vacuum to the gas pocket. Removing or wholly or partially counteracting the preloading force can make the decoupling diaphragm softer than it is in the ride mode. This is opposite to the conventional arrangement, where the diaphragm is stiffer in the idle mode.

The decoupling diaphragm may comprise a biasing portion arranged to provide a preloading force that tends to increase the stiffness of the decoupling diaphragm in the ride mode. The biasing portion may include a resilient element that is deformable when the decoupling diaphragm is mounted in the device. As discussed above, the gas pocket may be connectable to a vacuum source, e.g. the same vacuum source as that used to switch the actuator, to vary the pressure therein. Upon switching to the idle mode, the pressure in the gas pocket may be reduced to counteract the preloading force, and hence make the decoupling diaphragm less stiff than in the ride mode.

The preloaded decoupling diaphragm may be an independent aspect of the present invention. According to that aspect, there may be provided a hydraulically damped mounting device comprising: first and second anchor parts connected by a first deformable wall; a working chamber partially bounded by the first deformable wall, the working chamber containing hydraulic fluid; a compensation chamber for the hydraulic fluid, the compensation chamber being partially bounded by a second deformable wall; a first passageway interconnecting the working and compensation chambers to allow movement of the hydraulic fluid between the working and compensation chambers; a vacuum chamber connectable to a vacuum source for varying the pressure in the vacuum chamber; and a flexible decoupling diaphragm separating the vacuum chamber from the hydraulic fluid, wherein the decoupling diaphragm is preloaded to increase its stiffness. The decoupling diaphragm may include a biasing portion arranged to apply a preloading force that can be counteracted by a reduction in pressure in the vacuum chamber. The decoupling diaphragm may be mounted with a first surface in fluid communication with the working chamber and a second surface opposite the first surface in fluid communication with the vacuum chamber.

The decoupling diaphragm may be resilient. The biasing portion may include a preloaded portion of the diaphragm, e.g. a portion of the resilient diaphragm that is deformed when mounted in the device. The device may include a snubbing element to limit the extent of movement of the decoupling diaphragm.

DETAILED DESCRIPTION

In the detailed description below, common reference numbers are used to designate like parts to avoid unnecessary repetition.

Figure 1:
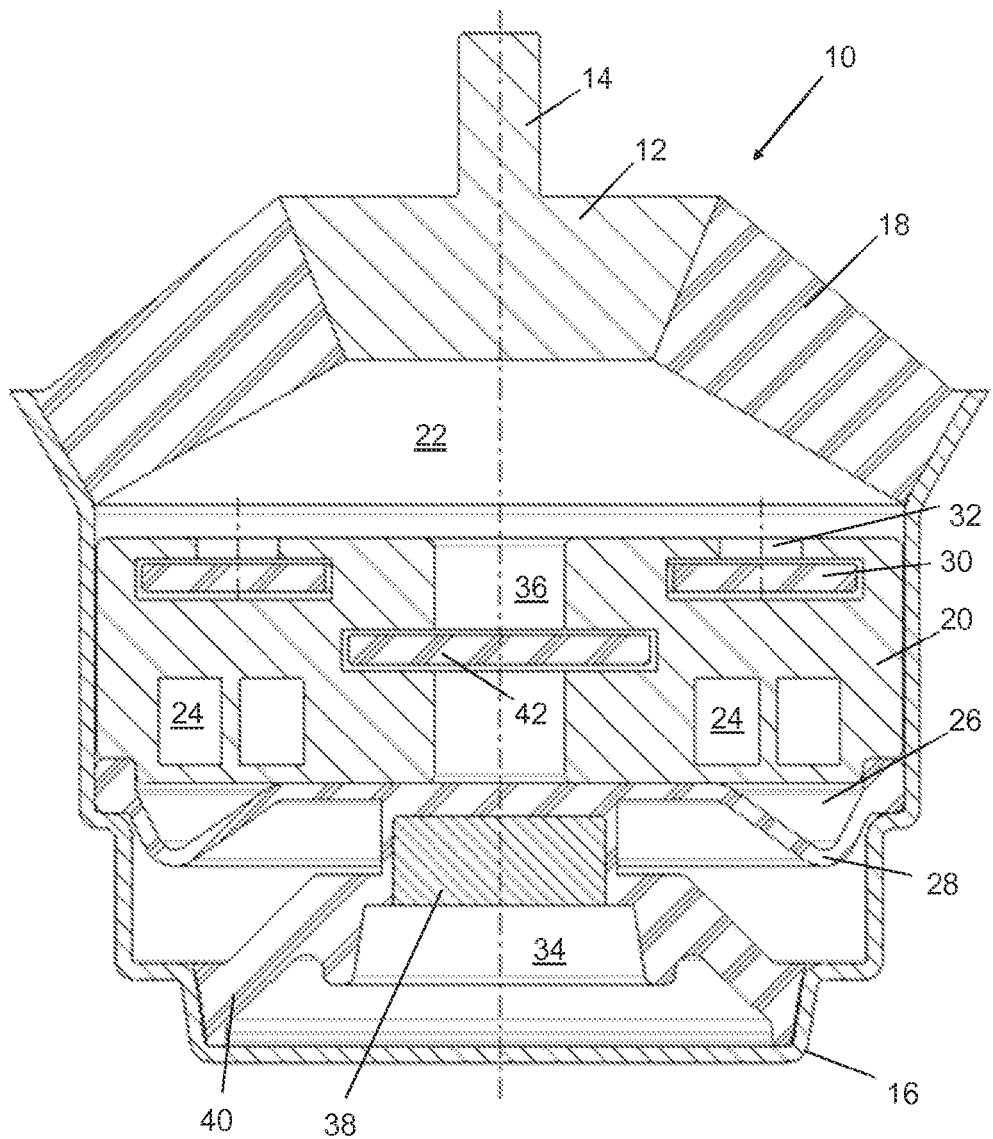
FIG. 1 shows a cross-sectional view of a mounting device having a floating diaphragm in a bypass channel that is an embodiment of the invention.

FIG. 1 shows a cross-sectional view through a hydraulically damped mounting device 10 for damping vibration between two parts of a structure (not shown). For example, the mounting device 10 may be used to damp vibration between a vehicle engine and a chassis of the vehicle. The mounting device has anchor parts arranged in a "cup and boss" type formation, whereby the mounting device has a boss 12 connectable via an attachment feature 14 to one of the parts of the structure and a generally U-shaped cup 16 connectable to the other of the parts of the structure.

A deformable wall, which in this embodiment comprises a resilient member 18 made of rubber, interconnects the boss 12 and cup 16. The resilient member 18 is rigidly fixed to the base of the boss 12 around which it extends, and flares radially outwardly from the base of the boss 12 towards the periphery of the mounting device. The thickness of the resilient member 18 tapers with distance from the boss 12, and the resilient member 18 is rigidly connected at its narrow end to the cup 16. In this way, relative movement between the boss 12 and the cup 16 is limited by the resilient member 18. For protection the resilient member may be covered by a cover (not shown) mounted on the cup 16 and having an aperture through which the boss 12 extends.

A rigid partition 20 extends across the open face of the cup 16 and is fixed around its periphery to the rim of the cup 16. The boss 12, the resilient member 18 and the partition 20 together define a working chamber 22 containing hydraulic fluid (not shown). The working chamber 22 is connected via a first passageway 24 to a compensation chamber 26. The compensation chamber 26 is bounded by the partition 20 and a compensation flexible wall 28 which is fixed to the rim of the cup 16 and sits within it. Movement of the flexible wall 28 enables the volume of the compensation chamber 26 to vary.

The first passageway 24 passes through the partition 20 to permit flow of hydraulic fluid between the working chamber 22 and the compensation chamber 26. The first passageway 24 has a convoluted shape and movement of fluid between the working chamber 22 and the compensation chamber 26 generates inertial damping of vibrations, due to cyclical relative movement between the boss 12 and the cup 16.

The partition 20 may house an annular deformable diaphragm 30, which is in fluid communication with the working chamber 22 via one or more fluid communication channels 32. The annular deformable diaphragm 30 separates the hydraulic fluid in the working chamber 22 from air in a gas pocket bounded by the annular diaphragm 30 and the partition 20. The gas pocket may be connectable to an external vacuum source (not shown) by a vacuum port in a conventional manner, or can be open to atmosphere.

A vacuum chamber 34 is formed between the cup 16 and a lower surface of the flexible wall 28. The vacuum chamber 34 can be connected to a vacuum source (not shown) to enable the pressure in the vacuum chamber 34 to be varied.

The partition 20 includes a second passageway 36 comprising a bore formed axially through the partition from an upper surface facing the working chamber 22 to a lower surface facing the compensation chamber 26. The flexible wall 28 includes an actuator 38 that is biased into abutment against the lower surface of the partition 20 by resilient portions 40 to close the second passageway 36. However, reducing the pressure in the vacuum chamber 34, e.g. by applying a vacuum, can overcome the biasing force to draw the actuator 38 away from the lower surface of the partition to open the second passageway 36. This is one example of a conventional bypass channel.

In the invention, a deformable disc-shaped diaphragm 42 is mounted in the partition 20 to restrict fluid movement through the second passageway 36. In this embodiment, the diaphragm 42 is seated in a groove 44 formed around the inner surface of the bore through the partition 20. The diaphragm 42 is not secured to the partition; it "floats" in the hydraulic fluid in the second passageway.

The diaphragm 42 acts as a flow limiting element in the second passageway 36. When the second passageway 36 is opened by drawing the actuator 38 away from the partition 20, fluid movement within the second passageway is permitted. This alters the damping characteristic of the device, since fluid can now move within both the first passageway 24 and second passageway 36 upon relative movement of the boss 12 and cup 16. The diaphragm 42 permits the movement of small volumes of fluid through the second passageway, primarily through axial movement of the diaphragm 42 within the second passageway 36 that is permitted by space provided within the groove 44. The upper and lower surfaces of the groove 44 act as snubbing surfaces to limit the amount of movement. The spacing or "play" provided by the groove 44 may be carefully tuned to limit the volume of fluid flow that is permitted. Small volumes of fluid may also flow due to flexing of the diaphragm or by passing around its periphery in the groove 44. Thus, the presence of the diaphragm 42 does not affect normal operation of the bypass channel for small amplitude fluid movements.

However, if the boss 12 and cup 16 experience a large amplitude relative movement, a high pressure can be applied to the fluid in the second passageway 36. In this case, the diaphragm 42 is pushed into engagement with the groove 44 to seal the second passageway 36 and resist or prevent further fluid movement. The diaphragm 42 thus prohibits movement of fluid in the second passageway 36 beyond a threshold volume, hence protecting the actuator 38 from the high pressure event. Such protection may enable the biasing force provided by the biasing portion 40 to be less than in device without a flow limiting element in the bypass channel, which in turn may enable the pressure variation required of the vacuum source to be reduced.

Figure 2:
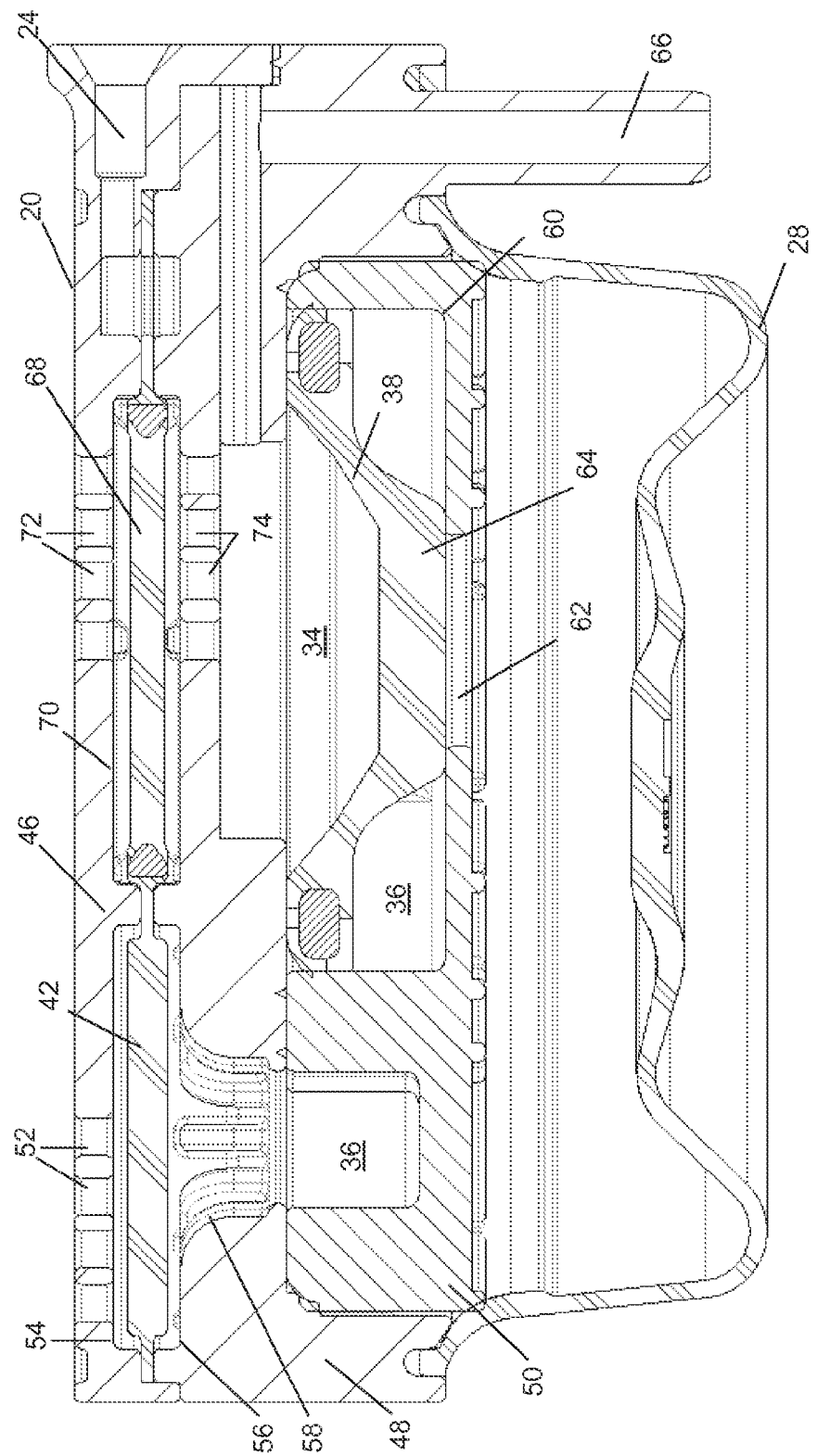
FIG. 2 shows a cross-sectional view of a mounting device having a sealed diaphragm in a bypass channel that is another embodiment of the invention.

FIG. 2 shows a cross-sectional view through another embodiment of the invention. The boss 12, the resilient member 18 and the cup 16 are omitted for clarity. The partition 20 in this embodiment includes an upper plate 46 and a lower plate 48, which are secured together when the partition 20 is mounted between the cup and boss. A partition base 50 is attached to the underside of the lower plate 48. The upper plate 46, lower plate 48 and partition base 50 are formed with through holes and recesses to provide the first passageway 24 and second passageway 36.

To form the second passageway 36, the upper plate 46 has one or more entry holes formed 52 therein, which lead to a recess 54 for receiving the flow limiting diaphragm 42 discussed above. A corresponding recess 56 is formed in the lower plate 48. In FIG. 2, the diaphragm 42 is clamped around its periphery between the upper plate 46 and lower plate 48, thereby sealing it in a chamber formed by the cooperating recesses 54, 56. The diaphragm could also be floating as in FIG. 1, in which case there would not be a seal. The recess 56 is in fluid communication with a part of the second passageway 36 formed in the partition base 50 via a tapering hole 58. The hole 58 includes a snubbing surface to restrict the deformation of the diaphragm 42.

The partition base 50 includes an actuator receiving recess 60 in which the actuator 38 is sandwiching between the partition base 50 and lower plate 48. An opening 62 in the partition base 50 provides fluid communication between the recess 60 and the compensation chamber 26. The actuator 38 comprises a body of resilient material having an abutment region 64 biased against the lower surface of the recess 60 to cover the opening 62. Similarly to the FIG. 1 embodiment, the actuator 38 separates the second passageway 36 from a vacuum chamber 34, which is connectable to a vacuum source (not shown) by a vacuum port 66 formed in the lower plate 48.

This embodiment also includes a decoupling diaphragm 68 mounted in a chamber 70 formed being two cooperating recesses formed in the upper plate 46 and lower plate 48. The upper plate includes one or more apertures 72 that open into the working chamber, so that an upper surface of the decoupling diaphragm is in fluid communication with the working chamber. The recess in the lower plate 48 has one or more channels 74 extending into the vacuum chamber 34, so that a second surface of the decoupling diaphragm 68 is in fluid communication with the vacuum source. The decoupling diaphragm 68 is therefore deactivated upon opening the second passageway 36, as is conventional.

In this embodiment, the flow limiting diaphragm 42 provides the same protection to the actuator 38 as described with reference to FIG. 1 above.

Figure 3:
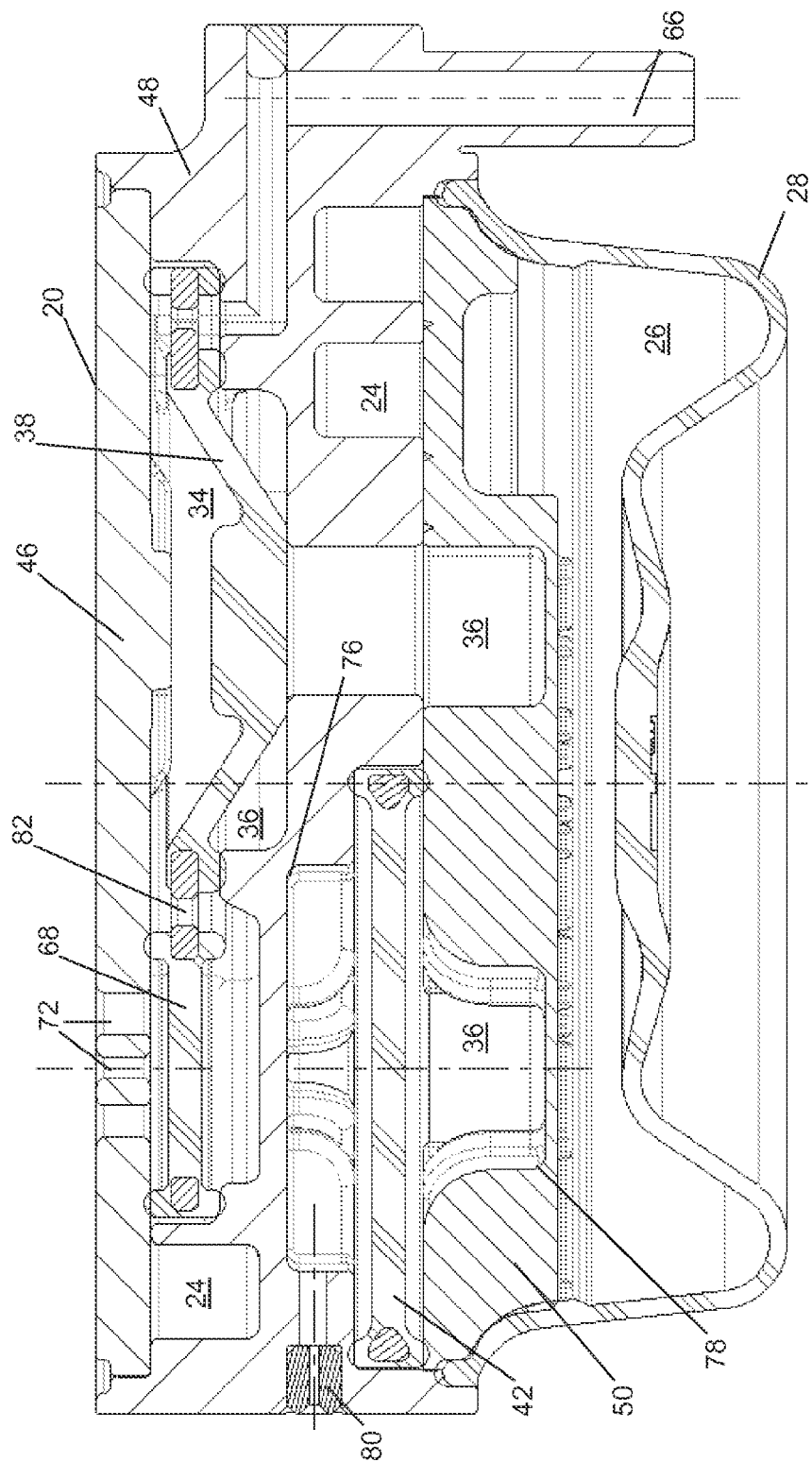
FIG. 3 shows a cross-sectional view of a mounting device having a diaphragm in a vented idle passageway that is another embodiment of the invention.

FIG. 3 shows a cross-sectional view through another embodiment of the invention. Similarly to FIG. 2, the boss 12, the resilient member 18 and the cup 16 are omitted for clarity. This embodiment is similar to FIG. 2, in that the partition 20 is formed from an upper plate 46, lower plate 48 and partition base 50. However, in this embodiment, the second passageway 36 is an idle channel, in that it is not in fluid communication with the compensation chamber 26. In addition, the flow limiting diaphragm 42 is located downstream from the actuator 38, i.e. further away from the working chamber than the actuator 38 along the second passageway 36.

The actuator 38 in FIG. 3 is seated in a chamber formed between the upper plate 46 and lower plate 48. Similarly to FIG. 2, the actuator 38 comprises a body of resilient material having an abutment region 64 biased to cover an opening into the second passageway 36. As above, the actuator 38 separates the second passageway 36 from a vacuum chamber 34. The second passageway 36 extends through the partition base 50 to communicate with the flow limiting diaphragm 42.

The flow limiting diaphragm 42 in FIG. 3 is clamped between the lower plate 48 and partition base 50 in a chamber formed by cooperating recesses 76, 78 formed in the lower plate 48 and partition base 50 respectively. The recess 78 in the partition base 50 is in fluid communication with the second passageway 36, so that the lower surface of the flow limiting diaphragm 42 is in fluid communication with the fluid in the second passageway 36. The diaphragm 42 provides a seal at the end of the second passageway 36, which prevents fluid from escaping. The recess 76 in the lower plate 48 is connected to the atmosphere outside the device by an air vent 80. This recess 76 includes a snubbing surface to restrict the deformation of the diaphragm 42.

This embodiment also includes a decoupling diaphragm 68 mounted in a chamber 70 formed between two cooperating recesses in the upper plate 46 and lower plate 48. The upper plate includes one or more apertures 72 that open into the working chamber, so that an upper surface of the decoupling diaphragm is in fluid communication with the working chamber. The recess in the lower plate 48 is in fluid communication with the vacuum chamber 34 via a connecting passage 82 formed between the actuator 38 and decoupling diaphragm 68 when mounted in position. The connecting passageway allows the vacuum to communicate simultaneously with the underside of the decoupling diaphragm 68 and the upper surface of the actuator 38, in order to pull them in opposite directions.

Figure 4:
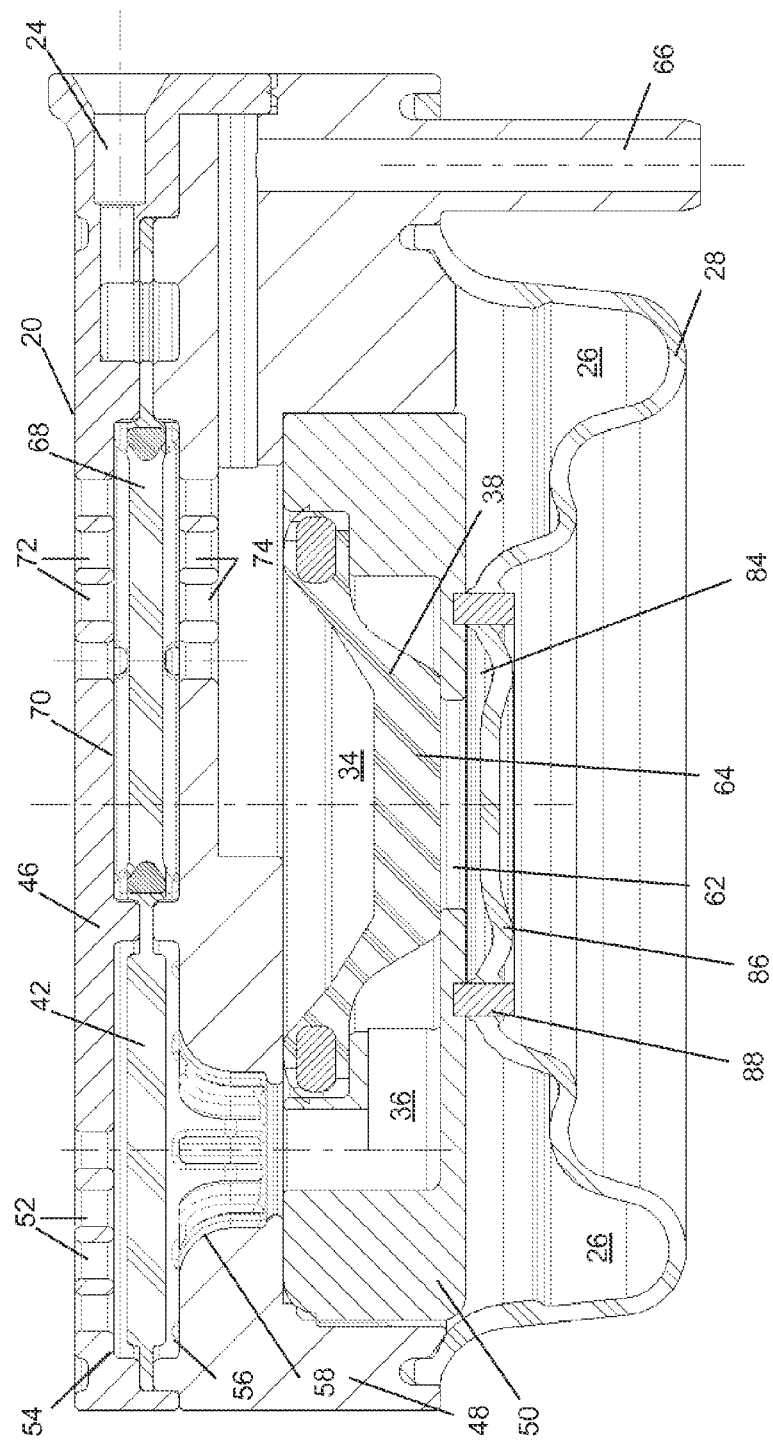
FIG. 4 shows a cross-sectional view of a mounting device having a diaphragm in a deformable-wall-terminated idle passageway that is another embodiment of the invention.

FIG. 4 shows a cross-sectional view of another embodiment of the invention. Similarly to FIG. 2, the boss 12, the resilient member 18 and the cup 16 are omitted for clarity. This embodiment corresponds very closely to FIG. 2 except that the second passageway 36 is not in fluid communication with the compensation chamber 26. Instead, the second passageway 36 terminates in an auxiliary chamber 84 bounded by a deformable wall 86 and the bottom surface of the partition base 50. In this embodiment, the deformable wall 86 may be part of the flexible wall 28 that spans across the base of the partition 20. The auxiliary chamber 84 is separated from the compensation chamber 26 by sealably securing the periphery of the deformable wall 86 to the partition base 50 by an annular attachment 88.

Figure 5:
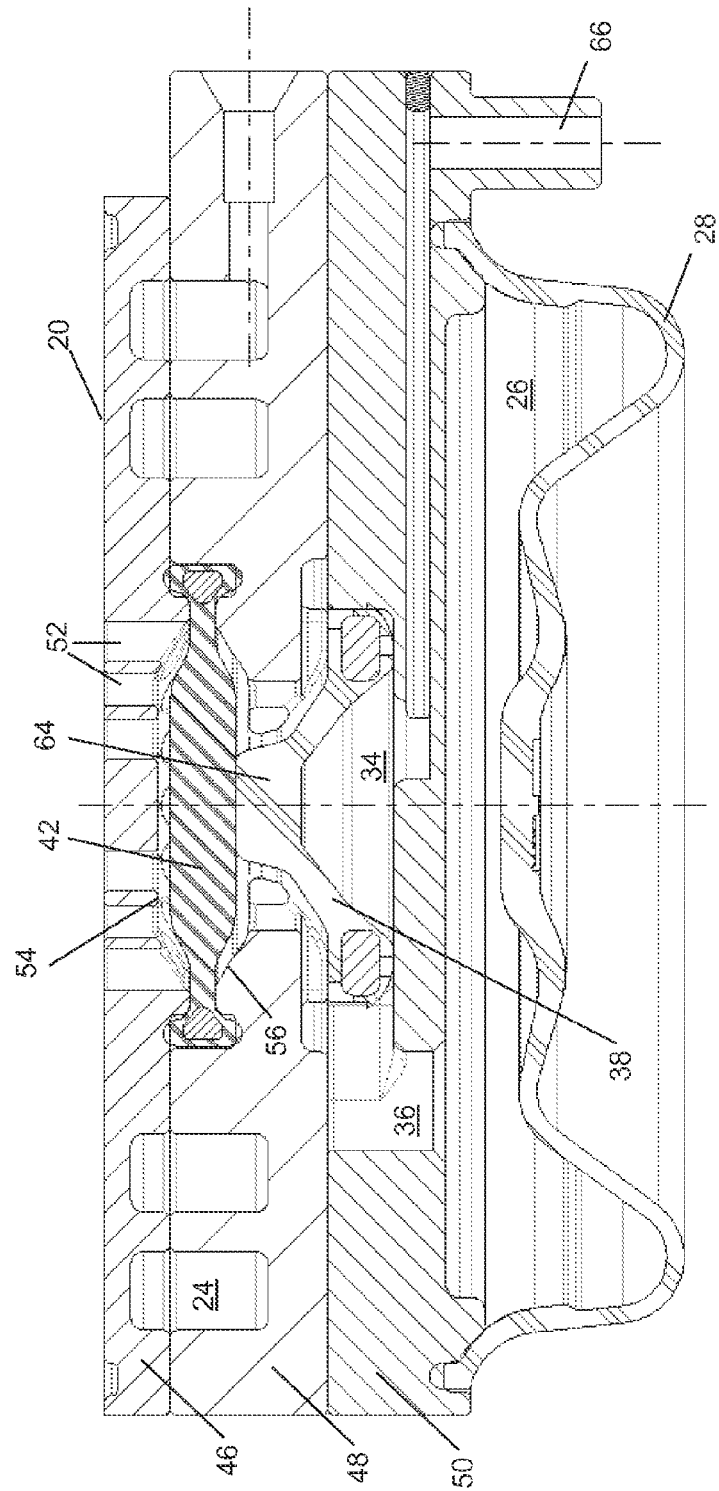
FIG. 5 shows a cross-sectional view of a mounting device having an actuator abutting a diaphragm that is another embodiment of the invention.

FIG. 5 shows a cross-sectional view of another embodiment of the invention. Again, the boss 12, the resilient member 18 and the cup 16 are omitted for clarity. Similarly to the embodiment shown in FIG. 2, the flow limiting diaphragm 42 is mounted in a chamber formed by recesses 54, 56 in the upper plate 46 and lower plate 48 of the partition 20. The surfaces of the recesses 54, 56 form snubbing surfaces to limit the movement of the diaphragm 42. In this embodiment, the actuator 38 is inverted compared with the embodiments discussed above. That is, the vacuum chamber 34 is located underneath the actuator 38. The actuator 38 itself includes a resilient element arranged to bias the abutment portion 64 into contact with the diaphragm 42. Thus, the actuator 38 in this embodiment does not seal the second passageway 36. Rather it functions as a means for adjusting the stiffness of the flow limiting diaphragm by subjecting it to the biasing force of the resilient element.

When the device is in the ride mode (no vacuum applied to the vacuum chamber 34), the actuator 38 abuts the flow limiting diaphragm 42, which has the effect of increasing its stiffness, i.e. resistance to fluid movement in the second passageway 36. The actuator limits the stiffness for lower amplitude vibrations. At higher amplitudes the diaphragm is snubbed by the abutment 56. This arrangement limits the stiffness required of the actuator, and hence allows smaller components to be used. The biasing force of the actuator 38 can be arranged such that the stiffening effect of the abutment is similar to that of sealing the second passageway 36. In other words, abutting the diaphragm 42 with the actuator 38 effectively shuts off the second passageway 36. Alternatively, the abutting the diaphragm 42 with the actuator 38 may allow a certain amount of fluid movement, e.g. to provide the same function as a conventional decoupling diaphragm. When the device switches to the idle mode (vacuum applied to the vacuum chamber) the actuator 38 is drawn away from the diaphragm 42. The diaphragm 42 then exhibits a softer (less stiff) characteristic as desired.

Figure 6:
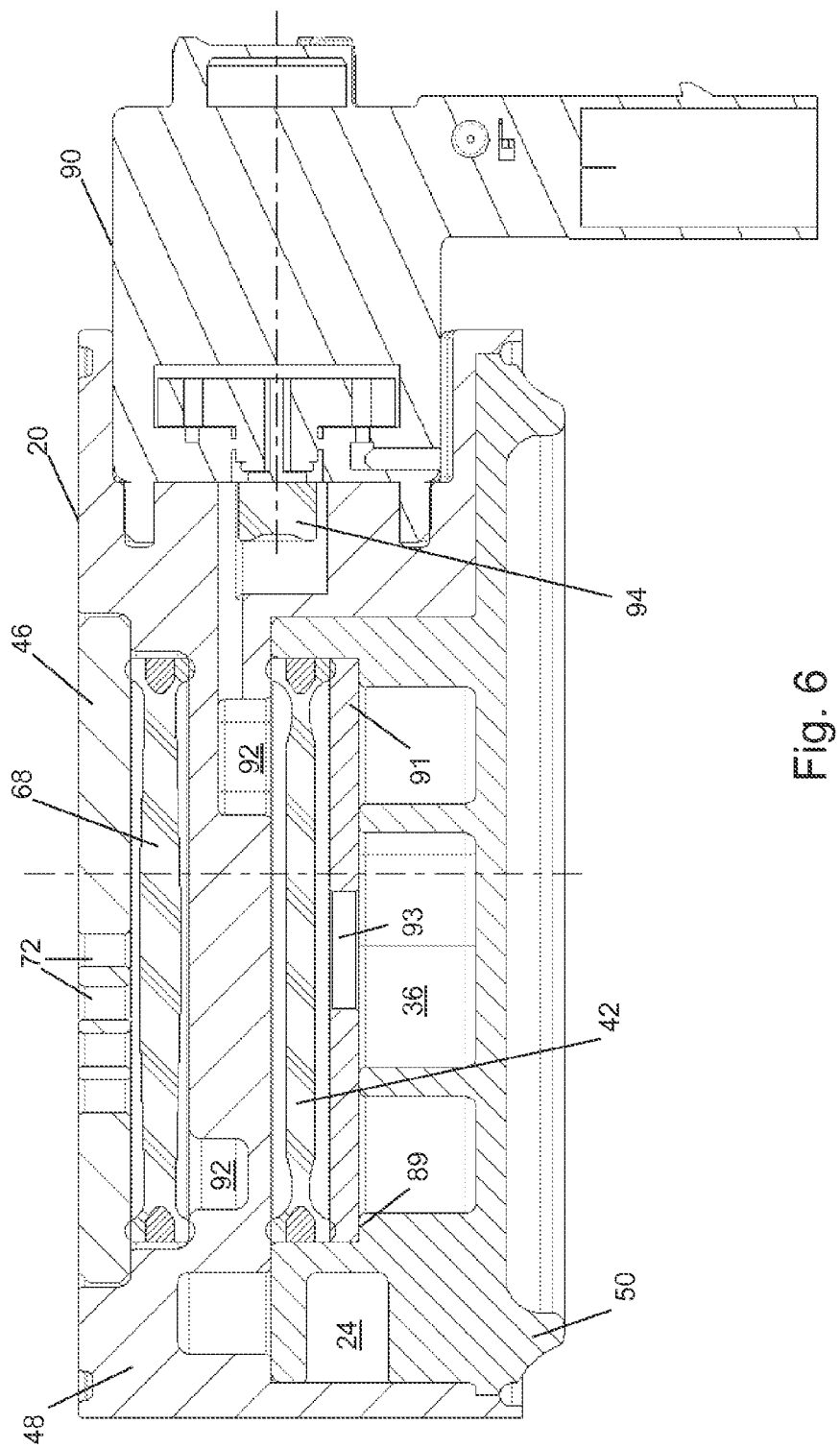
FIG. 6 shows a cross-sectional view of a mounting device having a valve-controlled vented diaphragm at the end of an idle passageway that is another embodiment of the invention.

FIG. 6 shows a cross-sectional view of another embodiment of the invention. Here only the partition 20 is shown. The boss 12, the resilient member 18, the cup 16 and the flexible wall 28 are omitted for clarity. In this embodiment the flow limiting diaphragm 42 is mounted between the lower plate 48 and partition base 50 in a recess 89 formed in the partition base 50. The diaphragm 42 is clamped between the lower plate 48 and a snubber plate 91 mounted in the recess 89. The snubber plate 91 includes an opening 93 into the second passageway 36, which in this embodiment comprises a volume in the partition base 50 that is in fluid communication with the working chamber. The diaphragm 42 is mounted in a sealing manner, so its lower surface acts to close the second passageway 36. Thus, in this embodiment the second passageway 36 is an idle channel, i.e. not in fluid communication with the compensation chamber.

The upper surface of the flow limiting diaphragm 42 is in fluid communication with a gas pocket 92 open to the atmosphere. A valve 90 is attached at the side of the lower plate 48 of the partition 20. The valve 90 includes an actuator 94, which can close (i.e. seal) the gas pocket 92 to switch the device between ride and idle modes. The embodiment demonstrates that the flow limiting diaphragm 42 may enable much smaller and responsive actuators to be used.

This embodiment also includes a decoupling diaphragm 68, whose lower surface is in fluid communication with the gas pocket 92.

Figure 7:
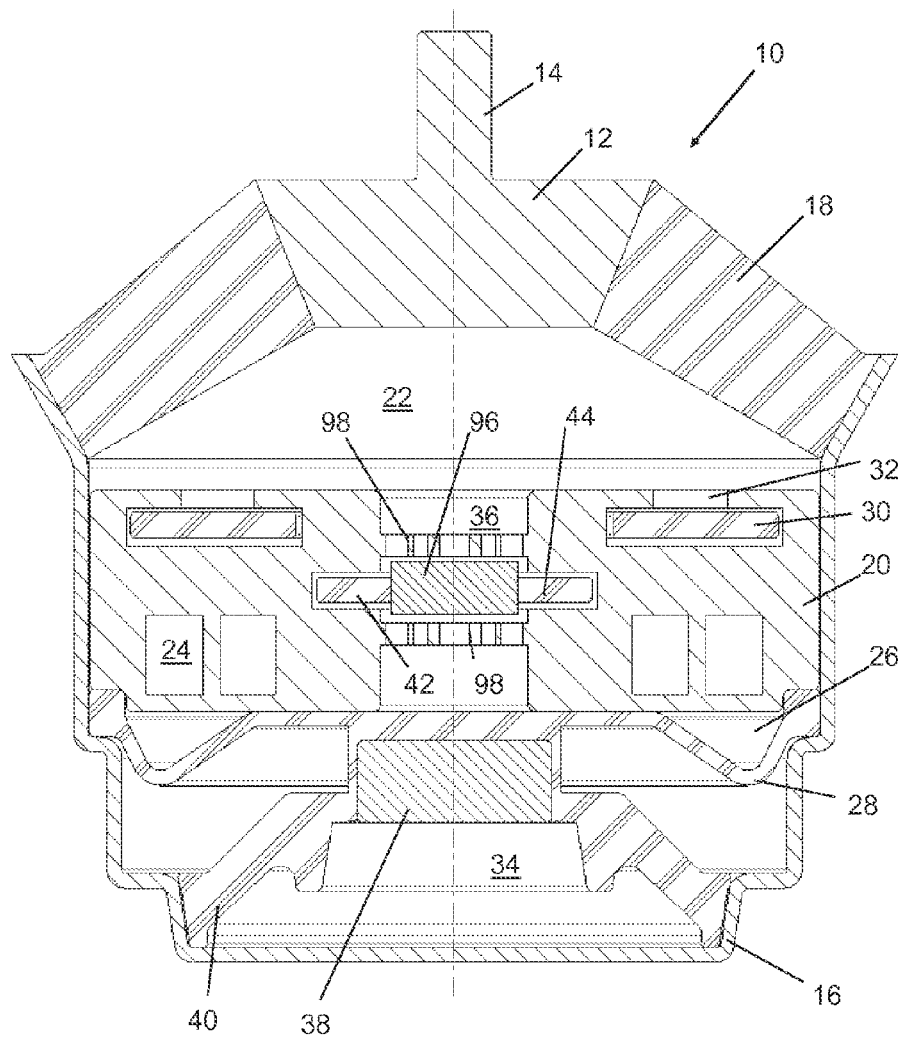
FIG. 7 shows a cross-sectional view of a mounting device having a floating diaphragm with additional mass in a bypass channel that is another embodiment of the invention.
Figure 8:
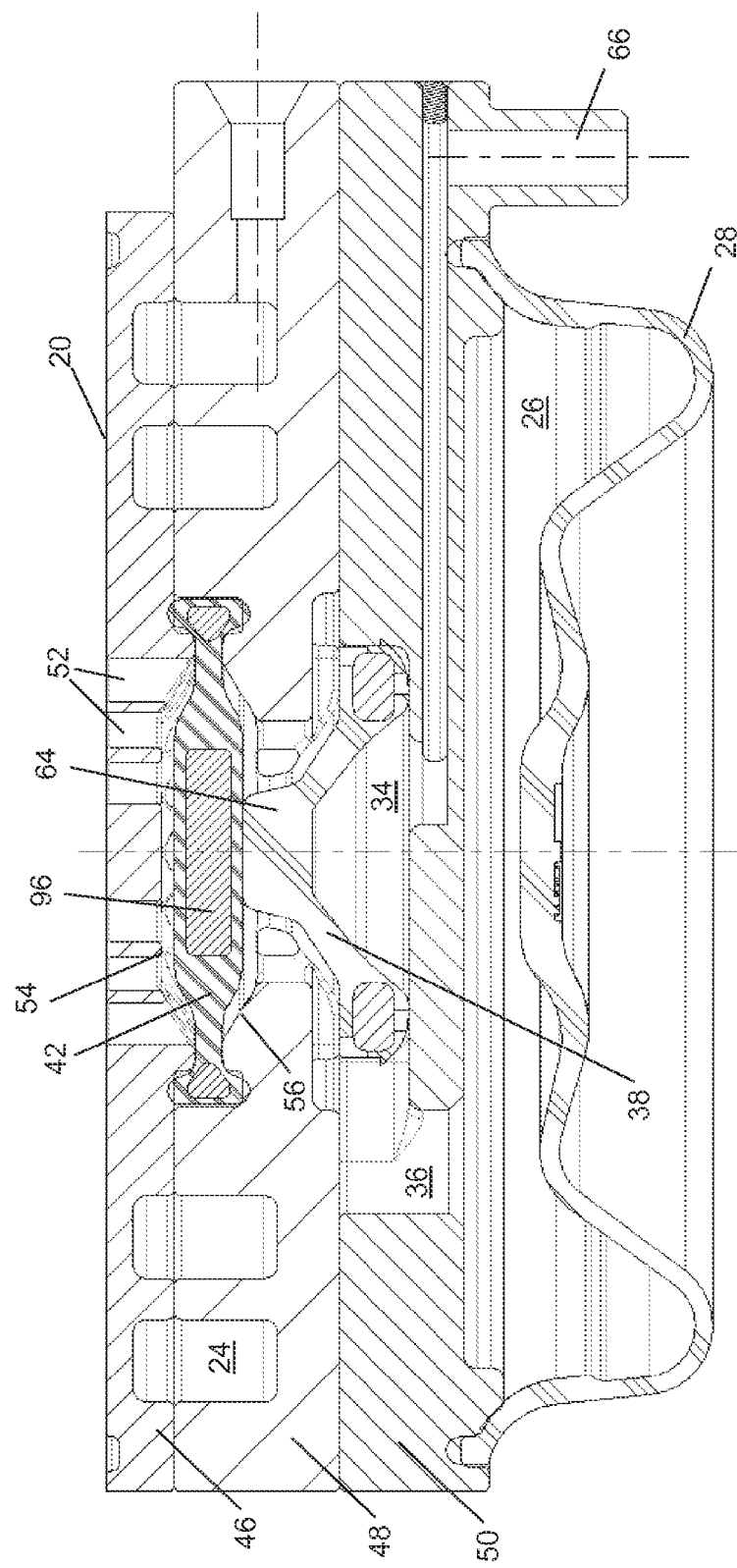
FIG. 8 shows a cross-sectional view of a mounting device having an actuator abutting a diaphragm with an additional mass in an idle passageway that is another embodiment of the invention.
Figure 9:
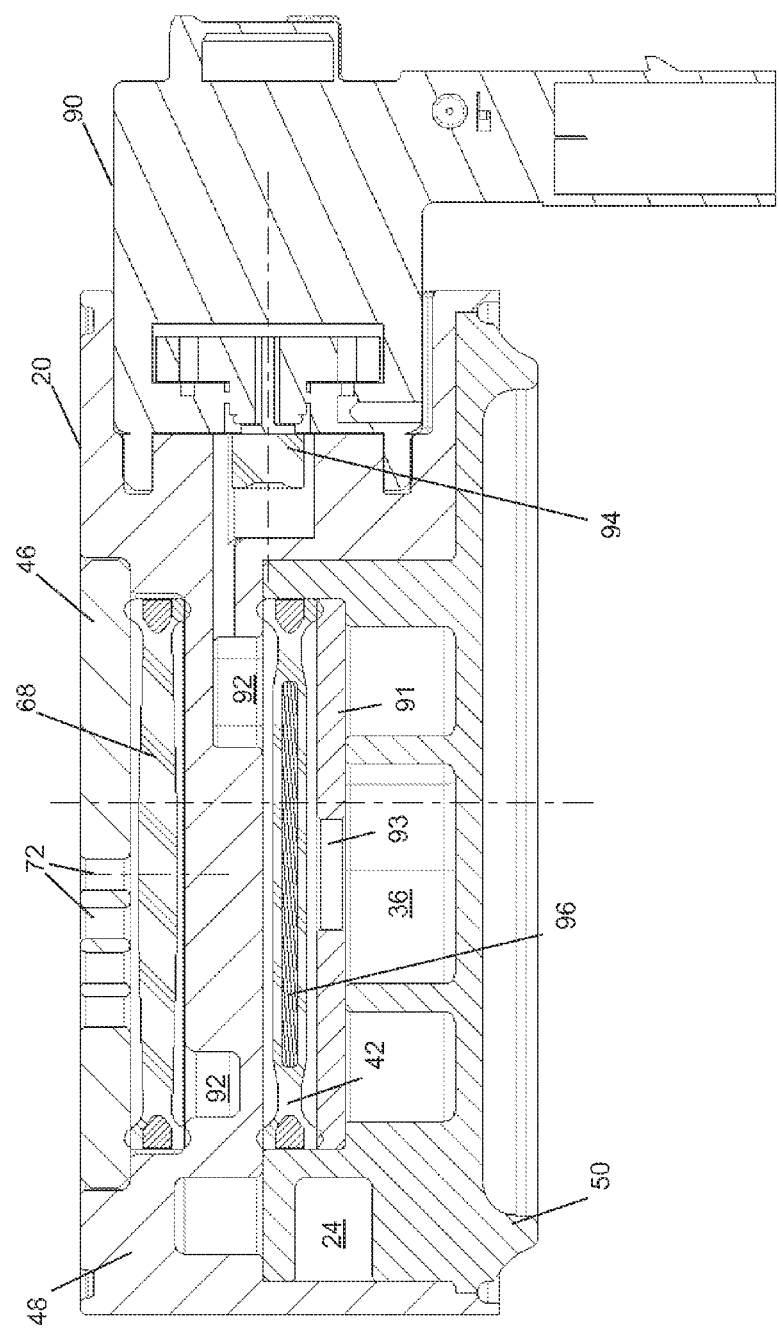
FIG. 9 shows a cross-sectional view of a mounting device having a diaphragm with an additional mass in a vented idle passageway that is another embodiment of the invention.

FIGS. 7 to 9 show cross-sectional views of further embodiments of the invention which respectively correspond to FIGS. 1, 5 and 6 above. The difference in the embodiments of FIGS. 7 to 9 is that the flow limiting diaphragm 42 in each case has an additional mass 96 associated with it. By increasing the effective mass (i.e. the movable mass) of the flow limiting diaphragm, its contribution to the overall movable mass represent by hydraulic fluid in the second passageway is increased, which can enable the second passageway to be formed with a smaller volume. Substituting a solid mass for fluid mass may be beneficial in that for a given requirement the length of channel can be reduced and/or the flow area of the channel can be less. This can facilitate a reduction in viscous losses from the fluid flowing through the channel which may improve the dip effect. The additional mass may be made from a metal material such as steel or brass.

In FIG. 7 the flow limiting diaphragm 42 is an annular diaphragm having the additional mass 96 secured, e.g. bonded, at its centre. The partition 20 also includes perforated snubber plates 98 which span the second passageway 36 on either side of the diaphragm to limit its movement.

In FIGS. 8 and 9 the additional mass 96 is embedded within the flow limiting diaphragm 42.

Figure 10:
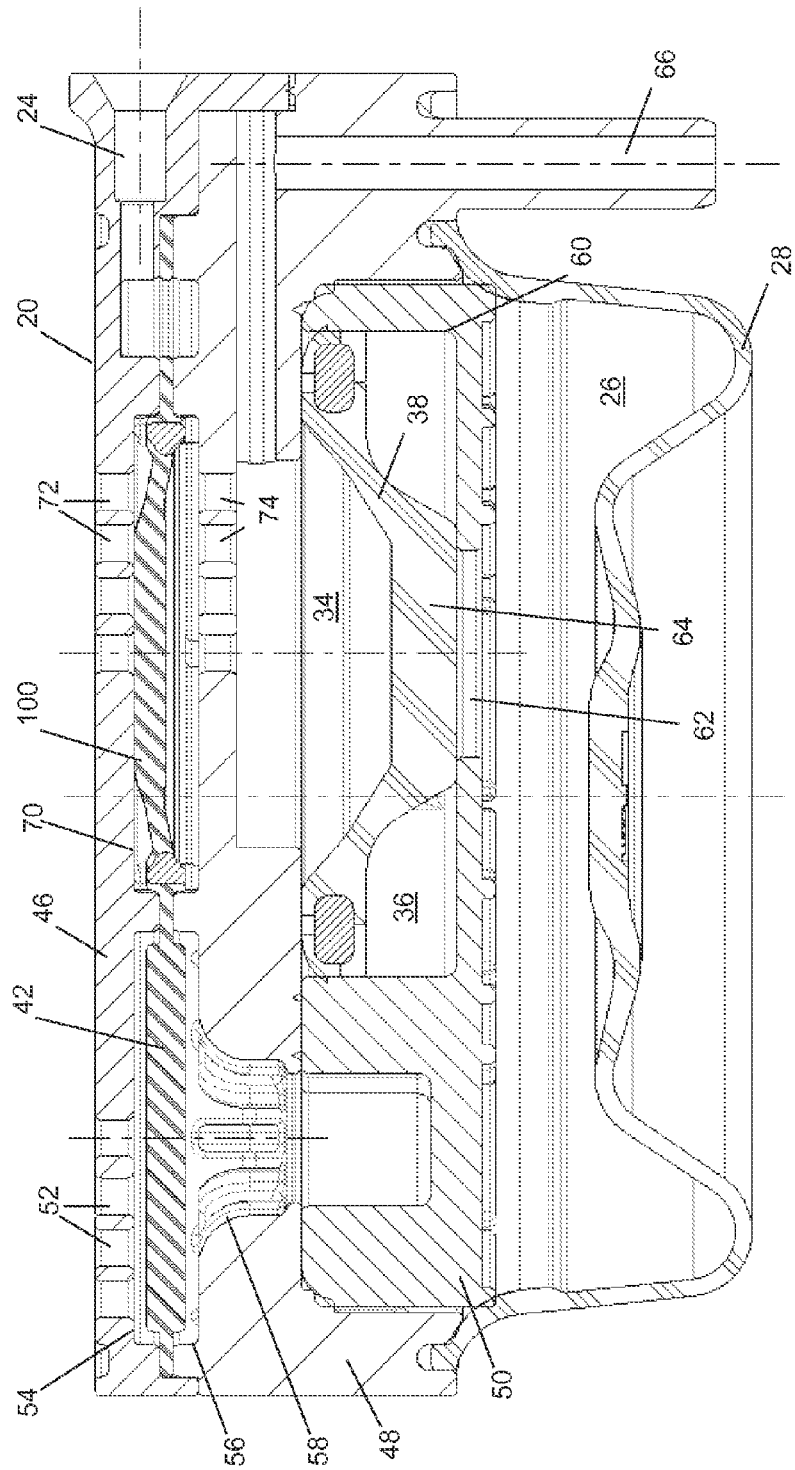
FIG. 10 shows a cross-sectional view of a mounting device having a pre-loaded decoupling diaphragm that is another embodiment of the invention.

FIG. 10 shows a cross-sectional view of another embodiment of the invention. This embodiment is identical to the FIG. 2 embodiment except for the decoupling diaphragm. In FIG. 10 the decoupling diaphragm 100 comprises a resilient body that is biased against the top surface of the chamber 70. For example, the resilient body may be deformed upon mounted in the chamber 70, thereby causing it to exert a biasing force against the upper plate 46. The decoupling diaphragm 100 is therefore preloaded to increase the effective stiffness presented to the working chamber.

In use, the decoupling diaphragm 100 therefore presents a stiffer resistance in the ride mode (no vacuum applied to vacuum chamber 34) than in the idle mode (vacuum applied to the vacuum chamber 34). The reduction in pressure experienced by the decoupling diaphragm 100 when there is a vacuum in the vacuum chamber counteracts the preloading force to soften the diaphragm (i.e. reduce its stiffness). Preferably the biasing (preloading) force is not completely overcome by the vacuum, so that the diaphragm still exhibits flexibility (ability to deform) when the device is in the idle mode.

The preloaded decoupling diaphragm 100 may be applied to any of the other embodiments discussed herein.

Figure 11A:
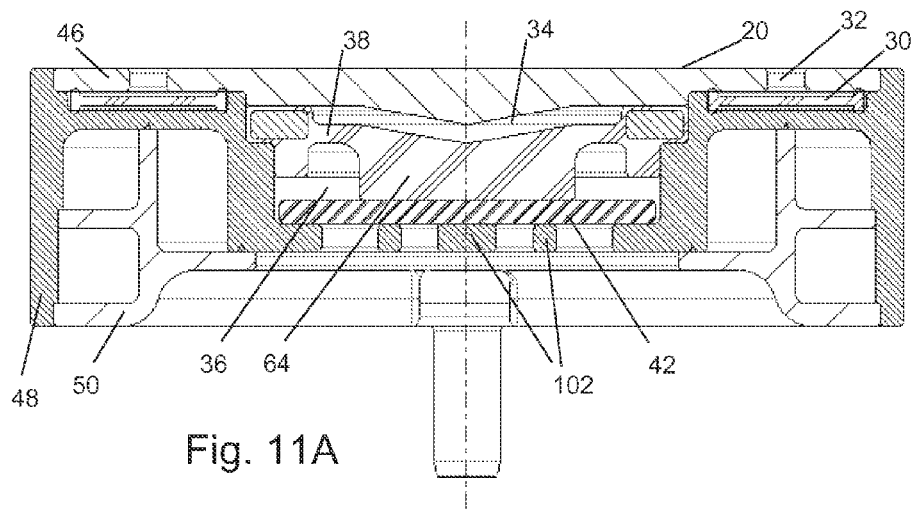
FIG. 11A shows a cross-sectional view of a mounting device having an actuator abutting a diaphragm that is another embodiment of the invention.

FIG. 11A shows a cross-sectional view of another embodiment of the invention. Here only the partition 20 is shown. The boss 12, the resilient member 18, the cup 16 and the flexible wall 28 are omitted for clarity. This embodiment is similar to FIG. 5 in that it has an actuator 38 with a resilient element that biases an abutment portion 64 in contact with the diaphragm 42. However, in this embodiment the actuator is orientated so that the direction of its biasing force reacts against a negative pressure in the working chamber (corresponding to upward movement of the mainspring mounting point).

Thus, the ride mode (no vacuum applied to the vacuum chamber 34), the actuator 38 holds the flow limiting diaphragm 42 against stops 102. As with the FIG. 5 embodiment, the purpose of the abutment is to increase the stiffness of the flow limiting diaphragm, i.e. its resistance to fluid movement in the second passageway 36. With the actuator orientation of FIG. 11A, when there is a positive pressure in the working chamber the actuator has no significant load to react against. Rather, the positive fluid pressure acts to increase the force with which the diaphragm is pushed against the stops. In contrast, when there is a negative pressure in the working chamber, the actuator does need to provide a reactive resistance force.

In practice, the peak negative pressure experienced within a working chamber is much lower than the peak positive pressure. Positive pressures of up to 5 bar ($5 \times 10^5$ Pa) are possible in the working chamber under high "compression" of the mainspring (i.e. a high amplitude downstroke). In contrast, negative pressure is limited by the vapour pressure of the fluid to values typically less than 0.95 bar (9.5×10⁴ Pa), i.e. nearly an order of magnitude less.

Thus, the actuator orientation shown in FIG. 11A provides the advantage that the maximum load required of the actuator is reduced or minimised, which in turn enables a smaller actuator to be used, which can be quicker to react and require less power to operate.

Figure 11B:
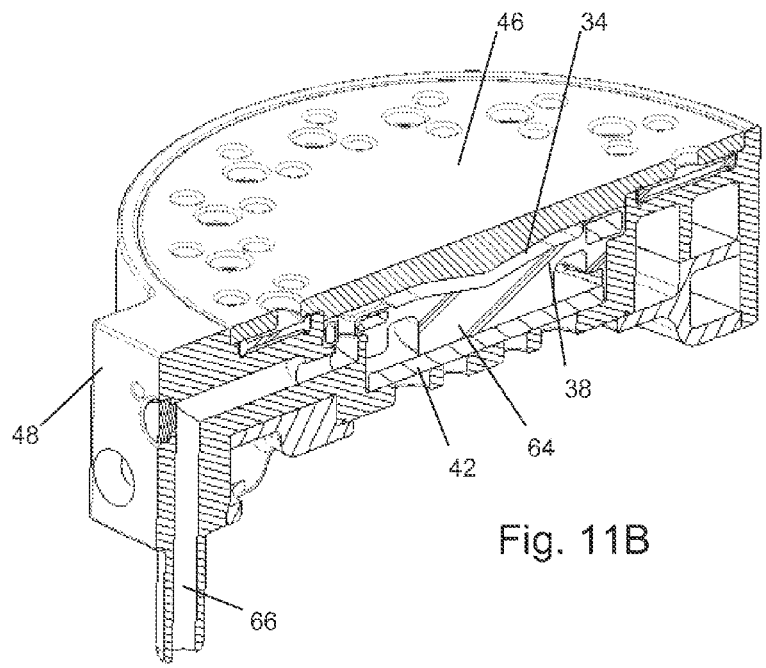
FIG. 11B is a cut-away perspective view of the mounting device shown in FIG. 11A.

FIG. 11B shows a cut away perspective view of the partition shown in FIG. 11A. This view shows the vacuum port 66 that leads to the vacuum chamber 34, which in this embodiment is between actuator 38 and the upper plate 46 of the partition 20.

What is claimed is:

1. A hydraulically damped mounting device comprising:
   first and second anchor parts connected by a first deformable wall;
   a working chamber partially bounded by the first deformable wall, the working chamber containing hydraulic fluid;
   a compensation chamber for the hydraulic fluid, the compensation chamber being partially bounded by a second deformable wall;
   a first passageway interconnecting the working and compensation chambers to allow movement of the hydraulic fluid between the working and compensation chambers;
   a second passageway in fluid communication with the working chamber;
   an actuator mounted to control fluid flow in the second passageway, the actuator being switchable between a first position in which it restricts fluid flow through the second passageway and a second position in which it permits fluid flow through the second passageway; and
   a flow limiting element mounted to prohibit movement of fluid into and out of the second passageway beyond a threshold volume when a pressure difference across the actuator causes the actuator to be in the second position, the flow limiting element being independent of the second deformable wall, and the threshold volume being independent of the pressure difference across the actuator,
   wherein the second passageway has engagement features arranged to restrict movement of the flow limiting element in the second passageway independently of the actuator to provide a physical limit on the maximum volume of fluid that can flow through the second passageway, and
   wherein the physical limit on the maximum volume of fluid that can flow through the second passageway acts to limit a maximum force on the actuator.

2. A device according to claim 1, wherein the flow limiting element is closer to the working chamber than the actuator along the second passageway.

3. A device according to claim 1 or 2, wherein the flow limiting element is actively controllable to exhibit different stiffness properties when the actuator is in the first position from when the actuator is in the second position.

4. A device according to any preceding claim, wherein the flow limiting element comprises a resilient diaphragm mounted across a fluid flow path through the second passageway.

5. A device according to claim 4, wherein the diaphragm provides a fluid seal across the second passageway.

6. A device according to claim 4 or 5, wherein the resilient diaphragm is mounted between the second passageway and a gas pocket.

7. A device according to claim 6, wherein the gas pocket is connected to an air vent that is switchable between open and closed positions.

8. A device according to claim 6, wherein the gas pocket is connectable to a vacuum source for varying the pressure therein.

9. A device according to any preceding claim, wherein the actuator includes an abutment portion for abutting the flow limiting element in the first position.

10. A device according to any preceding claim, wherein the actuator is movably mounted in a vacuum chamber that is connectable to a vacuum source for varying the pressure in the vacuum chamber to switch the actuator between the first position and second position.

11. A device according to any preceding claim, wherein the first passageway and second passageway are formed in or through a rigid partition separating the working chamber from the compensation chamber, the partition being rigidly associated with the first anchor part.

12. A device according to claim 11, wherein the second passageway is in fluid communication with the compensation chamber through the partition.

13. A device according to claim 11, wherein the second passageway is an auxiliary chamber separate from the compensation chamber.

14. A device according to claim 13, wherein the auxiliary chamber terminates at a deformable wall or an air vent to permit fluid movement within the second passageway.

15. A device according to any preceding claim including a snubbing element in the second passageway, the snubbing element being arranged to restrict the range of movement of the flow limiting member.

16. A device according to any preceding claim, wherein the flow limiting element has an additional mass connected to it.

17. A device according to any claim 16, wherein the additional mass is embedded in the flow limiting element.

* * * * *